United States Patent

Choi

[11] Patent Number: 5,636,313
[45] Date of Patent: Jun. 3, 1997

[54] DATA BANK APPARATUS AND METHOD OF A VIDEO RECORDING AND REPRODUCING SYSTEM

[75] Inventor: Seung-lyeol Choi, Kyunggi-do, Rep. of Korea

[73] Assignee: SamSung Electronics Co., Ltd., Suwon, Rep. of Korea

[21] Appl. No.: 791,226

[22] Filed: Nov. 13, 1991

[30] Foreign Application Priority Data

Nov. 20, 1990 [KR] Rep. of Korea ............. 90-18773

[51] Int. Cl.⁶ .................................. H04N 5/91
[52] U.S. Cl. .................. 386/46; 386/52; 386/64; 386/95; 360/13; 360/31
[58] Field of Search ............. 360/13, 31; 369/32, 369/83, 50; 386/46, 52, 64, 95; 395/600; 364/236.2, 236.3, 236.4

[56] References Cited

U.S. PATENT DOCUMENTS 4,789,961 12/1988 Tindall .................... 364/900
5,267,351 11/1993 Reber et al. ............... 360/13 X

FOREIGN PATENT DOCUMENTS

3415727A1 10/1985 Germany.

Primary Examiner—Andrew L. Sniezek
Attorney, Agent, or Firm—Robert E. Bushnell, Esq.

[57] ABSTRACT

A data bank apparatus and method for use in a video recording and reproducing system are disclosed. The apparatus includes scanning devices for respectively scanning two recording media to install and drive a video recording medium and an additional data recording medium, and two servos for driving the two recording media. Accordingly, user-assigned information can be recorded on a proper position of the data recording medium by the data scanning devices and the data servos, or can be retrieved from the data recording medium to be displayed on a display unit.

11 Claims, 3 Drawing Sheets

1

DATA BANK APPARATUS AND METHOD OF A VIDEO RECORDING AND REPRODUCING SYSTEM

BACKGROUND OF THE INVENTION

The present invention relates to a data bank apparatus and method for storing and reading out information needed by a user, in a video recording and reproducing system for recording video information on a recording medium and reproducing the recorded video information.

General video recording and reproducing systems, include video cassette recorders camcorder, etc. These video recording and reproducing systems have the basic function for recording video information on a recording medium and reproducing the recorded video information, plus additional functions which increase convenience, for instance, a parental locking function, an automatic rewinding function, a programmable recording function, etc.

With the advance of civilization, a modern person writes and manages birthdays of family members, phone numbers of relatives and acquaintances, schedules, housekeeping lists, a check list for the management of raising children, etc. by recording notes in a notebook. However, notes can be easily lost, since the notes are separately provided according to the frequency in use of the books.

SUMMARY OF THE INVENTION

Accordingly, it is an object of the present invention to provide a data bank apparatus and the performing method thereof which can be added to a video recording and reproducing apparatus, for storage and retrieval of information by a user.

To achieve the object of the present invention, a data bank apparatus is used in a video recording and reproducing system having a system controller for controlling and processing the system, a head drum including first scanning device for recording information on a recording medium and reading out and reproducing the information, a first servo for driving the head drum and the recording medium under the control of the system controller, a video processor for processing the video signal to be recorded in the first scanning device to supply the processed video information, or for processing the video information read out by the first scanning device to generate a reproduced video signal, and a key input for transferring user-assigned instructions and information to the system controller, the data bank apparatus comprising:

a second scanning device added onto the head drum for recording or reading out the information on or from a second recording medium;

a second servo for driving the second scanning device added onto the head drum;

a data processor for processing the digital data received from the system controller to be recorded on the second recording medium to supply it to the second scanning device, or processing the information read out by the second scanning device to supply the reproduced digital data to the system controller;

a signal converting device for converting the display data processed in the system controller into a video signal form;and a mixer for mixing the display video signal generated in the video processor with the information signal generated in the signal converting device.

To achieve the object of the present invention, a method performed in a data bank apparatus comprises the steps of:

setting a data base mode when a data base is required and receiving user-assigned information until a record or reproduction request exist;

recording the received information by finding out an information recording position when a record request exists in the information receiving step; and reproducing the information by finding out the data information on the received information when a reproduction request exists in the information receiving step.

BRIEF DESCRIPTION OF DRAWING

The above object and other advantages of the present invention will become more apparent by describing the preferred embodiment of the present invention with reference to the attached drawings, in which.

DETAILED DESCRIPTION OF THE INVENTION

Hereinafter, an embodiment of the present invention will be described with reference to the accompanying drawings.

Figure 1:
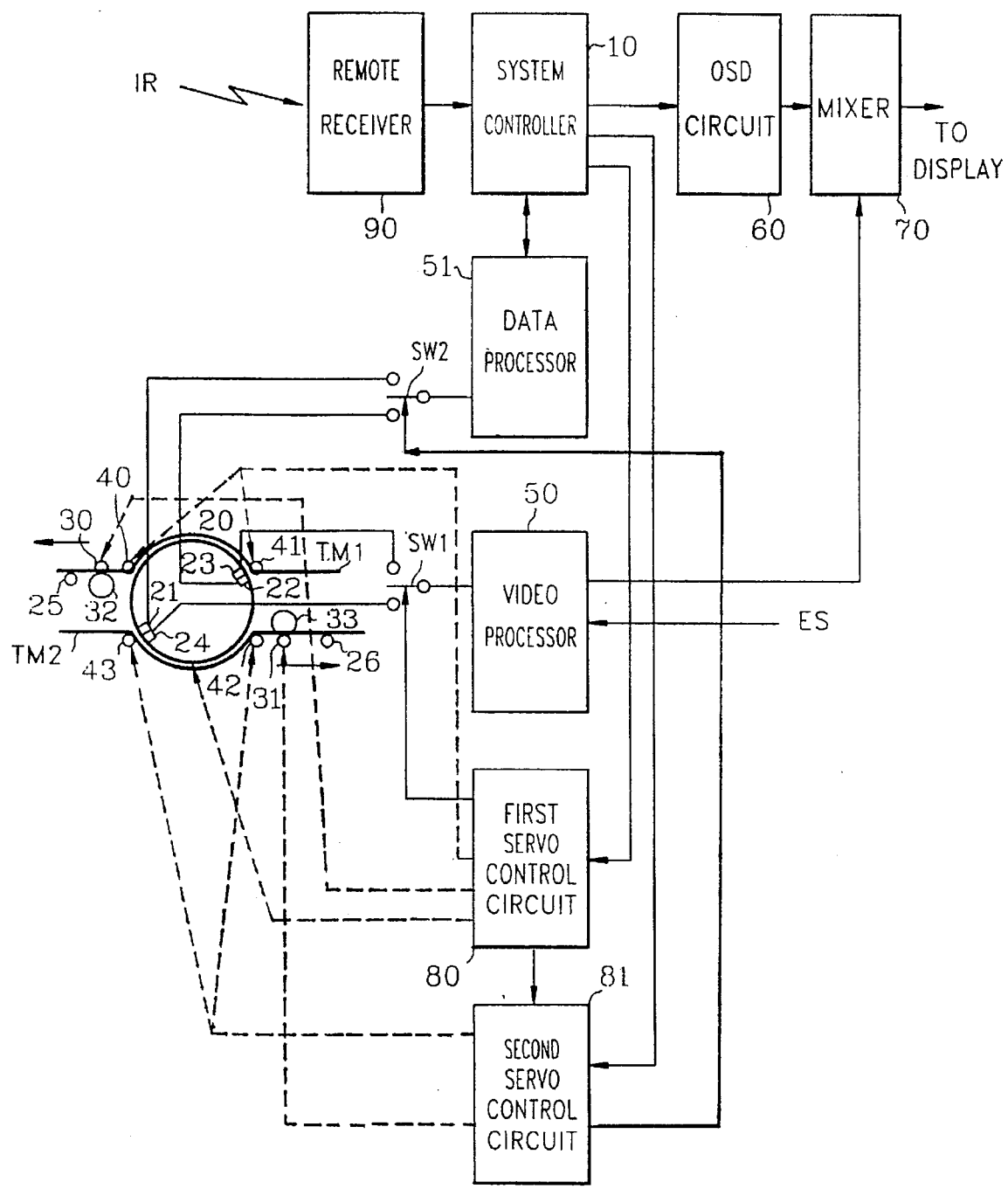
FIG. 1 is a block diagram of an embodiment of a data bank apparatus according to the present invention for use in a video recording and reproducing system.

In FIG. 1, first and second video heads 21 and 22 are mounted on a circumference 180° apart from each other, and first and second data heads 23 and 24 are provided beside first and second video heads 21 and 22 which are also 180° apart from each other.

First and second capstans 30 and 31 are installed to side of the circumference surface of head drum 20 and be at symmetric positions with respect to head drum 20, thereby constituting respective pairing with first and second pinch rollers 32 and 33. First and second slanted posts 40 and 41 are movably installed near the circumference surface of head drum 20, so that they may move in order for first record medium TM1 to make contact around or be slightly separated from a circumference surface less than half the head drum's circumference surface. Third and fourth slanted posts 42 and 43 are likewise installed in symmetric opposition to the circumference surface of head drum 20 around which first recording medium TM1 makes contact, so that they may move in order for second record medium TM2 to make contact around or be slightly separated from the circumference surface.

First and second control heads 25 and 26 are respectively installed to make contact with first and second record media TM1 and TM2 which are disposed apart from the head drum 20 and also are respectively connected to the first and second servo control circuits 80 and 81. The first and second servo control circuits 80 and 81 are each connected to a system controller 10. Two selection contacts of a first control switch SW1 are connected to first and second video heads 21 and 22, respectively, while a reference contact of SW1 is connected to a video processor 50 and a control terminal of SW1 is connected to first servo control circuit 80. Correspondingly, two selection contacts of a second control switch SW2 are also connected to first and second data heads 23 and 24, but a reference contact of SW1 is connected to a data processor 51 and a control terminal of SW1 is connected to second servo control circuit 81. The video processor 50 is connected between the reference contact of first control switch SW1 and a mixer 70. The data processor 51 is connected between the reference contact of second control switch SW2 and system controller 10. The on screen display circuit 60 receives an input from system controller 10 and an output is connected to mixer 70 which provides an output to a display unit (not shown). A remote receiver 90 provides an output for system controller 10.

In the operation of the apparatus shown remote receiver 90 receives an infrared (IR) signal sent from a remote transmitter, and supplies key data for a function and information assigned by a user to system controller 10.

During recording, video processor 50 processes the video signal received through an external signal source ES to to be recorded on a recording medium, and supplies the processed video signal to first and second video heads 21 and 22 through first control witch SW1. During reproducing, video processor 56 processes the video information received from first and second video heads 21 and 22 through first control switch SW1 and supplies the reproduced video signal to mixer 70.

Also during recording, data processor 51 converts the data received from system controller 10 into an analog signal to be recorded on the recording medium, and supplies the converted analog signal to first and second data heads 23 and 24 through second control switch SW2, and during reproducing, data processor 51 demodulates the analog signal received from first and second data heads 23 and 24 through second control switch SW2, and supplies the reproduced digital data to system controller 10. Here, the modulating/demodulating methods may be amplitude-shift keying, frequency-shift keying, phase-shift keying, quadrature amplitude modulation and demodulation, etc.

The on screen display circuit 60 converts the character data supplied from system controller 10 into a video signal and supplies the converted video signal to mixer 70. Mixer 70 mixes the video signal supplied from the on screen display circuit 60 with the video signal received from the video processor 50 and supplies the mixed signal to a display unit or an external video recording and reproducing system.

The first control switch SW1 selectively connects the video heads 21 and 22 for scanning first recording medium TM1, to video processor 50 by connecting a reference contact to one of two selection contacts according to a logic state of a first switching pulse supplied from first servo circuit 80. Similarly, second control switch SW2 selectively connects the data heads 23 and 24 for scanning second recording medium TM2 to data processor 51 by connecting a reference contact to one of two selection contacts according to a logic state of a second switching pulse supplied from Second servo circuit 81.

Under the control of system controller 10, the first servo circuit 80 moves first and second slanted posts 40 and 41 up and down, to contact or separate the first record medium TM1 with the circumference surface of head drum 20, while properly controlling rotating speeds of head drum 20 and first capstan 30 so that first and second video heads 21 and 22, disposed on the circumference surface of head drum 20, will alternatively scan slanted tracks of the first recording medium TM1 during recording and reproducing. During recording, first servo circuit 80 record control information for a running speed of the first record medium TM1 onto a control track through first control head 25. During reproducing, first servo circuit 80 receives the control information read out from first recording medium TM1 and properly controls the speeds of first capstan 30 and head drum 20.

Also under control of system controller 10, second servo circuit 81 moves third and fourth slanted posts 42 and 43 up and down, to contact or separate the second recording medium TM2 with the circumference surface of head drum 20, while properly controlling the rotating speeds of head drum 20 and second capstan 31 so that first and second data heads 23 and 24 attached on the circumference surface of head drum 20, will alternatively scan slanted tracks of the second recording medium TM2 during reproducing and recording. Second servo circuit 81 controls the rotating speeds of second capstan 31 and head drum 20 when a drum driving signal which indicates driving of first recording medium TM1, has been received from first servo circuit 80. Also, during recording, second servo circuit 81 records the control information for the running speed of second recording medium TM2 onto a control track through second control head 26. During reproducing, second servo circuit 81 receives the control information read out from the control track of second recording medium TM2, and properly maintains a relationship between the rotating speeds of second capstan 31 and head drum 20.

The system controller 10 receives the user's commands via remote receiver 90 and, according to instructions, controls first and second servo circuits 80 and 81 and the peripheral circuitry. Also, system controller 10 receives the user's input information through remote receiver 90 to record it on second recording medium TM2 through data processor 51 and first and second data heads 23 and 24, or sends the information reproduced by first and second data heads 23 and 24 and data processor 51 thorough on screen display circuit 60 and mixer 70 to be displayed on an external display unit.

In FIG. 1, first and second video heads 21 and 22 and first control switch SW1 correspond to a first scanning device, while first and second data heads 23 and 24 and second control switch SW2 correspond to a second scanning device. Further, first and second slanted posts 40 and 41, first control head 25, pinch roller 32, first capstan 30, and first servo circuit 80 correspond to a first servo device, while third and fourth slanted posts 42 and 43, second control head 26, second capstan 31, pinch roller 33, and second servo circuit 81 correspond to a second servo device.

Figure 2A:
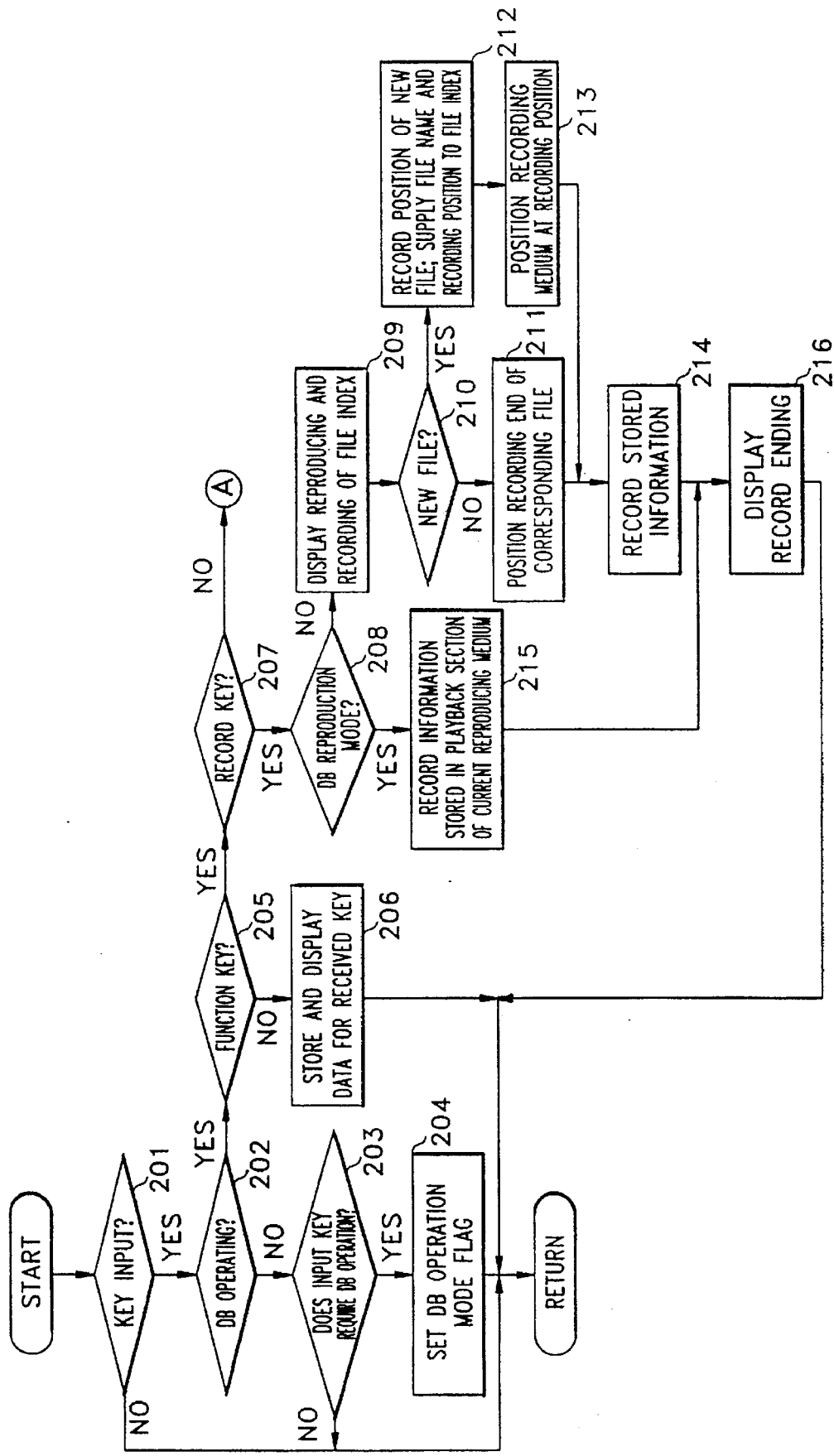
FIGS. 2A and 2B are flowcharts of the methods according to the present invention.
Figure 2B:
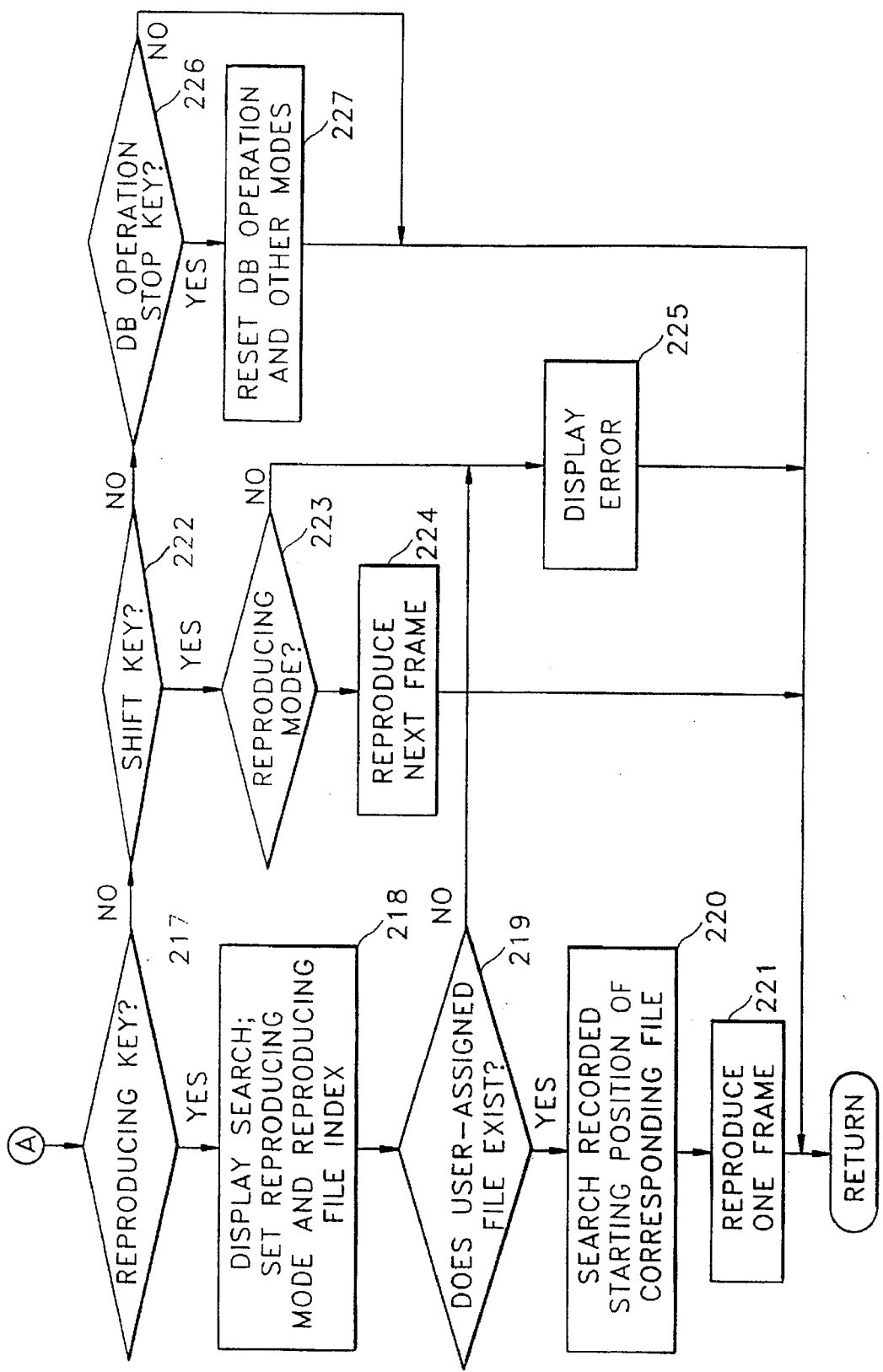

FIGS. 2A and 2B are flowcharts of a method of the present invention performed by system controller 10 of the circuit shown in FIG. 1. In FIGS. 2A and 2B, steps 201 through 206 correspond to an information receiving process, steps 207 through 216 correspond to an information recording process, and steps 217 through 227 correspond to an information reproducing process. The flowcharts shown in FIGS. 2A and 2B will be described in connection with the circuit shown in FIG. 1. While running a main program, system controller 10 periodically reads the output of an internal key data input buffer and checks whether or not the key data corresponding to the instruction or information controlling the user's assigned functions is received from remote receiver 90 in step 201. When key data is present in step 201, system controller 10 checks whether a data bank (referred to as DB) operation mode flag assigned in an internal register is set, and determines whether the a data bank is operating in step 202.

When the data bank operation mode flag is not set in step 20 system controller 10 checks the logic value of received key data to determine whether it requires the data bank to be operating in step 203.

When the received key data is a logic value for a key requiring data bank operation in step 203, then system controller 10 sets the data bank operation mode flag assigned in a register to set the mode to data bank operation mode, and reads out an input information message from an internal program memory and display the message on the external display unit through on screen display circuit 60 and mixer 70 in step 204.

If the data bank operation mode flag was set in step 202, system controller 10 checks a logic value of the received key data to determine whether it is for a function key in step 205.

When the logic value of the received key data does not corespond to a function key in step 205, system controller 10 determines an information key has been received, stores the data for the received information key in an internal working memory, and displays the data corresponding to the information key on a display unit through on screen display circuit 60 and mixer 70 in step 206. When the logic value of the received key data is for a function key in step 205, system controller 10 checks whether the logic value of the received key data corresponds to a record key in step 207.

When the logic value of the received key data is for a record key in step 207, system controller 10 checks whether the data bank reproduction mode flag assigned in the internal register is set to determine whether the data bank is currently being reproduced in step 208.

If the system is not in the data bank reproduction mode step 208, system controller 10 reads out the recording display message from the internal program memory, and displays it on the external display unit through on screen display circuit 60 and mixer 70. Also, system controller 10 controls second servo circuit 81 to load second recording medium TM2 so that a first, portion among intervals recorded with a file index on second recording medium TM2 is scanned by data heads 23 and 24, then, the system controller 10 rewinds the tape. While system controller 10 controls second servo circuit 81 to again reproduce second recording medium TM2, the system controller 81 receives the file index reproduced through data heads 23 and 24, second control switch SW2, and data processor 51 in step 209. When the file index of second record medium TM2 is reproduced, second servo circuit 81 senses a rotating speed of head drum 20 to control a rotating speed of second capstan 31 according to the sensed rotating speed of head drum 20. Second servo circuit 81 controls a switching speed of second control switch SW2 in order to connect the data head 23 or 24 which is in contact with second record medium TM2, to data processor 51. Further, second servo circuit 81 moves third and fourth slanted posts 42 and 43 upward to connect or load second recording medium TM2 to a circumference surface of head drum 20.

After carrying out step 209, system controller 10 checks whether a file name has been assigned in the file index for the information to be recorded and stored in the internal working memory exists in the file index in step 210.

When the assigned file name does exist in the file index in step 210, system controller 10 controls seconds servo circuit 81, making it run second recording medium TM2 at a high speed until a record position value read out from second recording medium TM2 by second control head 26 and received through second servo circuit 81, equals that of the first portion of the file recorded with the file name in the file index in step 211. After reaching the starting positioning of the portion where the coresponding file is recorded, system controller 10 performs a high speed search until reception of the data reproduced from data heads 23 and 24 through second control switch SW2 and data processor 51 is interrupted, and controls the second servo circuit 81 to stop the second record medium when the reproduced data is complete in step 211.

When the file name for recording the information stored in the working memory does not exist in the file index in step 210, system controller 10 sets the starting position,for recording the information stored in the working memory as recording position information which is larger by a predetermined value than the recording position information corresponding to an end portion recorded with a last file, and supplies the recording position information set for a new file together with the new file name stored in the working memory, to data heads 23 and 24 through data processor 51 and second control switch SW2. Also at the same time, system controller 10 controls second servo circuit 81 to drive head drum 20, second capstan 31 and second control switch SW2, so that second recording medium TM2 is scanned in a normal reproduction mode by data heads 23 and 24 in step 212.

After performing step 212, system controller 10 controls second servo circuit 81 to run second recording medium TM2 at a high speed until the recording position information for the set recording position value for recording new information is received from second control head 26 through second servo circuit 81, and then to stop the second recording medium TM2 in step 213.

After performing step 211 or 213, system controller 10 controls second servo circuit 81 to drive second capstan 31, head drum 20 and second control switch SW2, so that second recording medium TM2 is scanned in a normal record mode by data heads 23 and 24, and sequentially supplies the information to be recorded and being stored in the working memory to data heads 23 and 24 through data processor 51 and second control switch SW2 and records the information on second recording medium TM2 in step 214.

If the system is in the data bank reproduction mode in step 208, system controller 10 supplies the information stored in the working memory to data heads 23 and 24 through data processor 51 and second control switch SW2 and records the corrected information onto the reproducing position of second recording medium TM2 which is currently being reproduced in step 215.

After performing step 214 or 215, system controller 10 controls second servo circuit 81 to stop head drum 20, second capstan 31, and second control switch SW2, thereby stopping second recording medium TM2, and moving third fourth slanted posts 42 and 43 downward. Then, system controller 10 reads out the internally- stored record completion display message and displays it on the external display unit through on screen display circuit 60 and mixer 70 in step 216.

When the logic value of the received key data is different from that of the record key in step 207, system controller 10 sets the reproduction mode flag assigned in its register to set the mode to a data bank reproduction mode, reads out the searching display message stored in the internal program memory to display it on the external display unit through on screen display circuit 60 and mixer 70. Further, system controller 10 controls second servo circuit 81 to make the second recording medium TM2 contact the circumference surface of head drum 20, so that the scanning is sequentially performed by data heads 23 and 24 from the first portion among the portions where he file index in second recording medium TM2 is recorded, and then drives head drum 20, second capstan 31 and second control switch SW2, so that second recording medium TM2 is reproduced. At this time, system controller 10 receives the file index reproduced from data heads 23 and 24 through second control switch SW2 and data processor 51 in step 218.

After performing step 218, system controller 10 checks whether the user-assigned file name stored in internal working memory exists in the reproduced file index in step 219.

When the user-assigned file name exists in the reproduced file index in step 219, system controller 10 controls second servo circuit 81 to run second recording medium TM2 at a high speed until the recording position value read out from second recording medium TM2 by second control head 31 and received through second servo circuit 81, equals the recording position value of the record starting position of the file to be reproduced and being recorded together with the file name in the file index, and controls second servo circuit 81 to stop second recording medium TM2 for supplying reproduced record starting position value equal to the record starting position value of the file to be reproduced in step 220.

After performing step 220, system controller 10 controls second servo circuit 81 to drive head drum 20 second capstan 31 and second control switch SW2 so that second recording medium TM2 runs in a normal mode until the data corresponding to one picture screen is reproduced. System controller 10 stores the reproduced information received through second control SW2 and data processor 51 from data heads 23 and 24 in its internal working memory and, for every frame, displays the stored reproduced information on the external display unit through on screen display circuit 60 and mixer 70 in step 221.

If the logic value of the received key data different from that of the reproduction key in step 217, system controller 10 checks whether the value equals that of the shift key for reproducing a next frame, in step 222.

When the logic value of the received key data equals that of the shift key in step 222, system controller 10 checks whether the data bank reproduction mode flag assigned in a register is set in step 223.

When the data bank reproduction mode flag is set in step 223, system controller 10 reproduces the information corresponding to the next one picture screen and stores it in the internal working memory, and for every frame, supplies the information stored therein to the external display unit through on screen display circuit 60 and mixer 70 to be displayed in step 224.

When the user-assigned file name does not exist in the file index in step 219 or the data bank reproduction mode flag is not set in step 223, system controller 10 reads out the error display message stored in the internal program memory and displays it on the external display unit through on screen display circuit 60 and mixer 70 in step 225.

When the logic value of the received key data does not equal that of the shift key in step 222, system controller 10 checks whether the logic value corresponds to the data bank operation stop key in step 226.

When the logic value of the received key data equals that of the data bank operation stop key in step 226, system controller 10 resets the data bank operation mode flag assigned in the internal register to release the data bank operation mode, and initializes the data bank operation mode flag and other information for data bank operation in step 227.

As described above, the data bank apparatus according to the present invention has advantages in that the second recording medium for data bank is provided with a recording medium driving means, so that the first and second recording media are driven by the recording medium driving means, and when the data bank is required, the information recorded on the second recording medium is reproduce and displayed together with video information according to a predetermined program, thereby enabling the second recording medium to have a data bank function.

What is claimed is:

1. A method for maintaining a data bank in a video recording device, said method comprising the steps of:

determining in a recording mode of said video recording device if a data bank reproduction mode is selected;

if the data bank reproduction mode is selected, recording data stored in a playback section of a recording medium and displaying the data on a display of the video recording device;

if the data bank reproduction mode is not selected, displaying a file index corresponding to files stored in the data bank on the display, and determining if a listed file of the files listed in the file index corresponds to the data;

if the data corresponds to the listed file, locating an end position of the file, recording the data on the recording medium and displaying the data on the display; and if the data does not correspond to listed file, recording a position of a new file, naming the new file, adding the new file to the file index, recording the data on the recording medium and displaying the data on the display.

2. A method of operation for a video tape recorder having a data bank capability, said method comprising:

enabling a data bank mode in response to user selection of said data bank capability;

storing user entered data into an internal working memory of a system controller of said video tape recorder and displaying said user entered data;

reading indexing data from a file index portion of data recording media;

determining whether an assigned file name designated by said user constitutes a new file name in response to said indexing data;

advancing said data recording media until a recorded file is detected which corresponds to said assigned file name, and amending said recorded file which corresponds to said assigned file name in response to said user entered data, if said assigned file name does not constitute said new file name;

advancing said data recording media to an unrecorded portion, creating a new file corresponding to said assigned file name and amending said new file in response to said user entered data, if said assigned file name constitutes said new file name;

enabling a reproduction function of said data bank mode in response to user selection of a reproducing key;

reading and displaying said indexing data from said file index portion of said data recording media;

determining whether a user designated file name exists in response to said indexing data; and advancing said data recording media until a recorded file is detected which corresponds to said user designated file name, and reading and displaying contents of said recorded file corresponding said user designated file name if said assigned file name is determined to exist.

3. A method as claimed in claim 2, further comprising controlling an on-screen display circuit to display an indication of enablement of said data bank mode.

4. A method as claimed in claim 2, wherein reading said indexing comprises actuating data slant posts to lead said data recording media onto a rotating head drum.

5. A method as claimed in claim 4, wherein enabling said reproducing function comprises actuating said data slant posts to bad said data recording media onto said rotating head drum.

6. A method as claimed in claim 4, wherein displaying said contents of said recorded file comprises providing said contents to said system controller and said system controller operating an on-screen display circuit for controlling a display device.

7. A method as claimed in claim 2, further comprising providing data stored in a working memory of said system controller to a data processor and recording said data in said data recording media, in response to user selection of a record function during enablement of a reproducing function.

8. A method as claimed in claim 2, wherein said video recording media is loaded on said rotating head drum on a first side of an axis of rotation of said rotating head drum and said data recording media is loaded on said rotating head drum on a second side of said axis, said first side opposing said second side.

9. A method of operation for a video tape recorder having a data bank capability, said method comprising:

receiving input video signals from an external source and recording said input video signals on a video recording media via a first video head and a second video head of a rotating head drum in response to user enablement of a video recording mode;

detecting recorded video signals recorded on said video recording media via said first video head and said second video head and providing said recorded video signals to a video processor in response to user enablement of a video reproducing mode, said video processor processing said recorded video signals for display on a display device;

enabling a data bank mode in response to user selection of said data bank capability;

storing user entered database data into an internal working memory of a system controller of said video tape recorder and displaying said user entered data;

reading indexing data from a file index portion of data recording media;

determining whether an assigned file name designated by said user constitutes a new file name in response to said indexing data;

advancing said data recording media until a recorded file is detected which corresponds to said assigned file name, providing said user entered database data from said system controller to a data processor of said video tape recorder, modulating said database data in said data processor to generate input data signals, and recording said input data signals on said data recording media via a first data head and a second data head of said rotating head drum to amend said recorded file which corresponds to said assigned file name, if said assigned file name does not constitute said new file name;

advancing said data recording media to an unrecorded portion of said data recording media and creating a new file corresponding to said assigned file name, providing said user entered database data from said system controller to said data processor of said video tape recorder, modulating said database data in said data processor to generate said input data signals, and recording said input data signals on said data recording media via said first data head and said second data head of said rotating head drum to amend said new file, if said assigned file name constitutes said new file name;

enabling reproduction function of said data bank mode in response to user selection of a reproducing key;

reading and displaying said indexing data from said file index portion of said data recording media;

determining whether a user designated file name exists in response to said indexing data; and advancing said data recording media until a recorded file is detected which corresponds to said user designated file name, detecting recorded data signals recorded on said data recording media via said first data head and said second data head, providing said data signals to said data processor for demodulation to generate display data, and providing said display data to an on-screen display circuit controlling a display device, if said assigned file name is determined to exist.

10. A method as claimed in claim 9, wherein recording said input video signals on said video recording media comprises:

actuating video slant posts to load said video recording media onto said rotating head drum; and transporting said video recording media across said rotating head drum.

11. A method as claimed in claim 9, wherein recording said input data signals on said data recording media comprises:

actuating data slant posts to load said data recording media onto said rotating head drum; and transporting said data recording media across said rotating head drum.

* * * * *